UNITED STATES PATENT OFFICE.

GEORGE W. McMULLEN, OF PICTON, ONTARIO, CANADA, ASSIGNOR, BY MESNE ASSIGNMENTS, TO ZALMON G. SIMMONS, OF KENOSHA, WISCONSIN, ANDREW W. PRESTON, OF SWAMPSCOTT, MASSACHUSETTS, AND BRADLEY W. PALMER, OF BOSTON, MASSACHUSETTS, TRUSTEES.

SUGAR-MAKING PRODUCT.

1,040,561.     Specification of Letters Patent.     Patented Oct. 8, 1912.

No Drawing.     Application filed November 24, 1911. Serial No. 662,082.

*To all whom it may concern:*

Be it known that I, GEORGE W. McMULLEN, a citizen of the United States, residing at Picton, Ontario, Canada, have invented certain new and useful Improvements in Sugar-Making Products, of which the following is a specification.

This invention relates to improvements in sugar-making products and processes of making the same and refers more particularly to improvements in the art of treating sugar-cane.

The chief object of my invention is to produce finely-disintegrated stably-dry sugar-cane comprising both the pith and woody constituents of the cane; the pith, to within a relatively small percentage of the whole, structurally dissociated from the woody constituents and reduced to granular or sawdust form and the woody portions, to within a relatively small percentage, structurally dissociated from the pith and in the form of excelsior-like filaments ranging in length from a foot or more down to fractions of an inch. Such disintegrated sugar-cane contains its sugar content practically uninverted and is characterized before being dried by being an open permeable but more or less coherent mass through which hot gases may be passed readily and freely for the purpose of drying, and which after drying may be compressed into a bale which is permanently stable even under adverse atmospheric conditions and exposures and which remains immune to fermentation beneath the surface and immediately subjacent portions. The mass is further characterized, after being dried, in that the pith and woody shreds are structurally dissociated from one another and can be efficiently separated.

It is well known that sugar-cane comprises two classes of cellular tissue, namely, the woody fibers and the pith.

I take the sugar cane when harvested and in the condition in which it is common to subject it to crushing mills and I shred it finely, thereby reducing it to a mass in which the pith to within a relatively small proportion of the whole, is in the form of sawdust-like particles and the woody constituents exist in the form of fine excelsior-like filaments ranging in length from a fraction of an inch to a foot or more which I refer to hereinafter as "shreds." In this condition the pith and the woody constituents are quite perfectly torn apart and structurally dissociated but at the same time they are thoroughly intermingled in the mass. This mixture of pith and shreds is an open permeable and more or less coherent mass. In order to bring the mass into the above condition I shred the cane when it is in substantially the same condition as when freshly cut; and the apparatus used should be capable of reducing the woody constituents to comparatively fine or excelsior-like shreds or filaments. I have found that any sugar juices, that are exuded from the cane during the shredding, are again absorbed by the shreds and the pith and are therefore fully retained. In presence of the sugar juices, the pithy matter is loosely coherent and loosely adherent to the fibrous material. I next dry the shredded mass to a condition of chemical stability before any material fermentation or inversion has taken place and under such conditions that neither inversion or caramelization will occur.

The water may be removed from the shredded mass by drying it in any suitable apparatus in which the material is subjected, in well-distributed or spread-out form, to the action of a current of heated air or other gas which is conducted through the mass of material.

I have found that the condition to which the mass has been shredded is a feature of much importance in the step of drying. That is to say, the presence of the excelsior-like or filamentary woody fibers insures the mass being kept in a sufficiently open and permeable condition as to permit free flow of the gases and vapors therethrough, whereby the moisture is readily extracted from every part of the mass.

In order that the material should be rendered chemically stable under ordinary atmospheric exposures it is necessary that it be dried to a condition containing less than thirty per cent. moisture and I prefer to reduce the moisture content to from six to fifteen per cent.

Ordinarily in the practical carrying out of sugar making it will be necessary or desirable to transport the product from the vicinity where the cane is grown, shredded and dried, to some other location where the sugar making can be more advantageously performed. For this purpose I reduce the dried product to such form that it can be most economically transported and be at the same time stable, even under adverse conditions.

I have discovered that this dry product produced as above described may be compacted into blocks so dense as to be practically impervious to moisture and immune against fermentation. I have discovered that if the material above described is not dried below a moisture content of say six to ten per cent. it may be compacted in an ordinary baling press to a density of about forty to sixty pounds per cubic foot, and that in this condition the blocks or bales will not only retain their form without binding wires but may be exposed to rain and the weather without spoiling or becoming water-soaked except on the surface. Moreover, the interior of such bale appears to be immune against fermentation, and this is so notwithstanding that no precaution whatever has been taken to insure sterilization or to avoid infection of the material before baling.

The product is in ideal condition for the extraction of its sugar content, which may be carried out in an ordinary diffusion battery. In case it has been previously baled it will be necessary before extracting to disintegrate the bales, which may be conveniently accomplished by means of any appropriate disintegrating machine as for example by a gang of wabble saws.

I claim:—

1. Disintegrated sugar-cane, dried to a condition of chemical stability, having its sugar content substantially uninverted, and comprising a mixture of granular pithy matter with filamentary shreds of woody fiber.

2. Disintegrated sugar-cane, dried to a condition of chemical stability, having its sugar content substantially uninverted and comprising a dense, compacted mixture of granular pithy matter with filamentary shreds of woody fiber.

3. Disintegrated sugar-cane, dried to a condition of chemical stability and having its sugar content substantially uninverted and compacted to a state of substantial impermeability to atmospheric moisture.

4. As a new sugar-producing product, disintegrated sugar-cane, stably dry, having its sugar content substantially uninverted and comprising a mixture of the pith and woody constituents, the pith, to within a relatively small percentage of the whole, structurally dissociated from the woody constituents and reduced to sawdust-like form, and the woody constituents, to within a relatively small percentage of the whole, structurally dissociated from the pith and in the form of excelsior-like filaments varying in length from several inches down to fractions of an inch.

5. A dense block or bale substantially weatherproof in and of itself and consisting of disintegrated sugar-cane, stably dry, having its sugar content substantially uninverted and comprising a mixture of the pith and woody constituents, the pith, to within a relatively small percentage of the whole, structurally dissociated from the woody constituents and reduced to sawdust-like form and the woody constituents, to within a relatively small percentage of the whole, structurally dissociated from the pith and in the form of excelsior-like filaments varying in length from several inches down to fractions of an inch.

6. As a new article of manufacture, a mass, in the form of a solid block or bale, composed of disintegrated sugar-cane, practically impermeable to weather exposures, stable under weather exposures except as to the surface portions thereof, and compacted and cemented together into said solid form in and by the water and sugar contents thereof.

7. As a new article of manufacture, disintegrated sugar-cane, dried to a condition of chemical stability and comprising a mixture of pity matter and fibrous shreds.

8. A bale of disintegrated sugar-cane, practically stable as regards deterioration under weather exposures, and of a specific gravity not much less than 1.

GEORGE W. McMULLEN.

Witnesses:
HECTOR M. HOLMES,
J. SIDNEY STONE.

---

Copies of this patent may be obtained for five cents each, by addressing the "Commissioner of Patents, Washington, D. C."

Correction in Letters Patent No. 1,040,561.

It is hereby certified that in Letters Patent No. 1,040,561, granted October 8, 1912, upon the application of George W. McMullen, of Picton, Ontario, Canada, for an improvement in "Sugar-Making Products," an error appears in the printed specification requiring correction as follows: Page 2, line 98, for the word "pity" read *pithy;* and that the said Letters Patent should be read with this correction therein that the same may conform to the record of the case in the Patent Office.

Signed and sealed this 10th day of December, A. D., 1912.

[SEAL.]

C. C. BILLINGS,
*Acting Commissioner of Patents.*